United States Patent
Hughes, Jr. et al.

(10) Patent No.: US 9,311,673 B2
(45) Date of Patent: Apr. 12, 2016

(54) SECURITY TRANSACTION MATCHING

(75) Inventors: John T. Hughes, Jr., Stratford, CT (US); Bruce E. Friedman, Monroe, CT (US)

(73) Assignee: Nasdaq, Inc., New York, NY (US)

(*) Notice: Subject to any disclaimer, the term of this patent is extended or adjusted under 35 U.S.C. 154(b) by 2169 days.

(21) Appl. No.: 10/206,150

(22) Filed: Jul. 25, 2002

(65) Prior Publication Data

US 2003/0225672 A1     Dec. 4, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2012.01)
*G06Q 40/04* (2012.01)

(52) U.S. Cl.
CPC ..................... *G06Q 40/04* (2013.01)

(58) Field of Classification Search
USPC ..................................... 705/35–45
See application file for complete search history.

(56) References Cited

U.S. PATENT DOCUMENTS

| | | | |
|---|---|---|---|
| 4,809,168 A | | 2/1989 | Hennessy et al. |
| 5,077,665 A | * | 12/1991 | Silverman et al. ............... 705/37 |
| 5,101,353 A | | 3/1992 | Lupien et al. |
| 5,195,100 A | * | 3/1993 | Katz et al. ..................... 714/22 |
| 5,297,031 A | | 3/1994 | Gutterman et al. |
| 5,412,612 A | * | 5/1995 | Oyama ................ G06F 3/0601 365/228 |
| 5,440,749 A | * | 8/1995 | Moore et al. ................... 712/206 |
| 5,684,794 A | * | 11/1997 | Lopez .................... H04W 88/08 370/337 |
| 5,774,879 A | | 6/1998 | Custy et al. |
| 5,812,988 A | | 9/1998 | Sandretto |
| 5,827,071 A | | 10/1998 | Sorensen et al. |
| 5,924,082 A | | 7/1999 | Silverman et al. |
| 5,991,739 A | * | 11/1999 | Cupps .................... G06Q 10/08 705/26.61 |
| 6,014,643 A | | 1/2000 | Minton |
| 6,035,287 A | | 3/2000 | Stallaert et al. |
| 6,157,914 A | | 12/2000 | Seto et al. |
| 6,202,125 B1 | | 3/2001 | Patterson et al. |
| 6,247,000 B1 | | 6/2001 | Hawkins et al. |
| 6,278,982 B1 | | 8/2001 | Korhammer et al. |
| 6,317,726 B1 | | 11/2001 | O'Shaughnessy |
| 6,317,728 B1 | | 11/2001 | Kane |
| 6,442,533 B1 | | 8/2002 | Hinkle |
| 6,505,174 B1 | * | 1/2003 | Keiser et al. ................. 705/36 R |
| 6,601,044 B1 | | 7/2003 | Wallman |

(Continued)

OTHER PUBLICATIONS

What is Main Memory? From http://www.webopedia.com/TERM/M/main_memory.html.

(Continued)

*Primary Examiner* — Olabode Akintola
(74) *Attorney, Agent, or Firm* — Nixon & Vanderhye P.C.

(57) ABSTRACT

A securities processor includes non-volatile storage, a first-in-first-out queue maintained in the non-volatile storage to store events, a random access memory, and an order book maintained in the random access memory to store one or more events corresponding to quotes or outstanding orders related to a security. A matching process receives the events from the queue, determines whether the event can be matched with a contra-side event stored in the order book, and executes a transaction between the received event and a matched contra side event if a match is found.

12 Claims, 2 Drawing Sheets

(56) References Cited

U.S. PATENT DOCUMENTS

| | | | |
|---|---|---|---|
| 6,704,601 B1* | 3/2004 | Amely-Velez | A61N 1/08 607/32 |
| 7,082,133 B1 | 7/2006 | Lor et al. | |
| 7,110,975 B2* | 9/2006 | Marks de Chabris et al. | 705/37 |
| 7,167,844 B1 | 1/2007 | Leong et al. | |
| 7,181,424 B1 | 2/2007 | Ketchum et al. | |
| 7,184,441 B1 | 2/2007 | Kadambi et al. | |
| 7,246,092 B1 | 7/2007 | Peterson et al. | |
| 7,246,093 B1* | 7/2007 | Katz | G06Q 40/00 705/35 |
| 7,318,045 B2 | 1/2008 | Baecker et al. | |
| 7,496,533 B1 | 2/2009 | Keith | |
| 7,689,495 B1* | 3/2010 | Kim et al. | 705/37 |
| 2001/0034686 A1 | 10/2001 | Eder | |
| 2002/0099647 A1* | 7/2002 | Howorka et al. | 705/37 |
| 2002/0138401 A1 | 9/2002 | Allen et al. | |
| 2002/0156716 A1 | 10/2002 | Adatia | |
| 2002/0198820 A1 | 12/2002 | Mills | |
| 2003/0009413 A1 | 1/2003 | Furbush et al. | |
| 2003/0083973 A1 | 5/2003 | Horsfall | |
| 2003/0140027 A1 | 7/2003 | Huttel et al. | |
| 2003/0225671 A1 | 12/2003 | Miller et al. | |
| 2003/0225673 A1 | 12/2003 | Hughes, Jr. et al. | |
| 2003/0225674 A1 | 12/2003 | Hughes, Jr. et al. | |
| 2003/0229557 A1 | 12/2003 | Richmann et al. | |
| 2003/0229566 A1 | 12/2003 | Moore et al. | |
| 2003/0229567 A1 | 12/2003 | Serkin et al. | |
| 2003/0229568 A1 | 12/2003 | Richmann et al. | |
| 2004/0034591 A1 | 2/2004 | Waelbroeck et al. | |
| 2004/0143542 A1 | 7/2004 | Magill et al. | |

OTHER PUBLICATIONS

Computer Data Storage from http://en.wikipedia.org/wiki/computer_storage.

RAM: A Brief Introduction from http://www.linfo.org/ram.html.

John Wiley & Sons Ltd, Dictionary of Multimedia and Internet Applications: A Guide for Developers and Users, 1999, retrieved by xreferplus.com.

U.S. Appl. No. 10/206,129, filed Jul. 25, 2002, Office Action dated Apr. 10, 2008. [15 Pages].

U.S. Appl. No. 10/206,148, filed Jul. 25, 2002, Office Action dated Mar. 13, 2009. [11 Pages].

U.S. Appl. No. 10/206,149, filed Jul. 25, 2002, Office Action dated Mar. 17, 2009. [13 Pages].

U.S. Appl. No. 10/206,151, filed Jul. 25, 2002, Office Action dated Feb. 4, 2009. [13 Pages].

U.S. Appl. No. 10/206,316, filed Jul. 25, 2002, Office Action dated Mar. 25, 2009. [17 Pages].

U.S. Appl. No. 10/206,789, filed Jul. 25, 2002, Office Action dated Dec. 31, 2007. [15 Pages].

U.S. Appl. No. 10/206,892, filed Jul. 25, 2002, Office Action dated Dec. 22, 2008. [16 Pages].

Facing A new reality: The SIA Conference addresses changing technology needs in a changing world. Editorial Staff. Traders Magazine. New York: Jun. 1, 2002. p. 1.

* cited by examiner

SECURITY TRANSACTION MATCHING

RELATED APPLICATIONS

This application claims the priority of U.S. Provisional Patent Application No. 60/385,979, entitled "Supermontage Architecture," and filed on Jun. 5, 2002, and U.S. Provisional Patent Application No. 60/385,988, entitled "Security Processor," and filed on Jun. 5, 2002.

TECHNICAL FIELD

This invention relates to security transaction matching.

BACKGROUND

In a stock market, a transaction between a buyer and seller of a security is executed when the purchase price matches the selling price. In one example, such as the Nasdaq Stock Market, the orders are received from different market participants (such as Market Makers and Electronic Commerce Networks) by central servers. New incoming orders are compared against contra side orders in an in memory order book, and if a match is found (i.e., a buy order matches a sell order, or vice versa), a transaction is executed. If no match is found, the new order is stored in the in memory order book to await matching with later orders.

SUMMARY

In general, in one aspect, the invention is directed towards a securities processor that includes non-volatile storage and a first-in-first-out queue maintained in the non-volatile storage. The queue stores a set of events that signals a matching process that matches orders or quotes to complete a transaction involving a security.

Implementations of the invention may include one or more of the following features. The set of events include an order to buy a security, an order to sell a security, an instruction to cancel a previous order, and an instruction to modify a previous order. The set of events include a quote to sell a security, a quote to buy a security, and an instruction to modify a previous quote. The set of events include a supervisory command that affects orders or quotes related to one or more securities. The security is listed on a public stock market. The securities processor includes a random access memory for storing an order book having one or more quotes or outstanding orders related to the security. The securities processor includes an order entry module that receives orders from buyers and sellers of the security, examines the validity of the orders, and sends valid orders as events to the queue. The securities processor includes a quote entry module that receives quotes from buyers and sellers of the security, examines the validity of the quotes, and sends valid quotes as events to the queue.

In general, in another aspect, the invention is directed towards a securities processor that includes non-volatile storage, a first-in-first-out queue maintained in the non-volatile storage to store events, a random access memory, and an order book maintained in the random access memory to store one or more events corresponding to quotes or outstanding orders related to a security. The securities process includes a matching process to receive the events from the queue, determine whether the event can be matched with a contra-side event stored in the order book, and execute a transaction between the received event and a matched contra side event if a match is found.

In general, in another aspect, the invention is directed towards a method for processing securities transactions that includes providing a queue in a non-volatile storage, storing events in the queue, the events including transactions related to buying or selling a security, providing an order book that stores orders and/or quotes to buy and/or sell the security, retrieving an event that is stored in the queue, and determining whether the event can be matched with a contra-side event related to the security to execute a transaction between the received event and a matched contra side event for the security if a match is found.

Implementations of the invention may include one or more of the following features. Determining whether the event can be matched with a contra-side event includes if the event relates to selling a security, determining whether the event can be matched with a pending event related to buying the security. The transactions include an order to buy a security, an order to sell a security, and an order to modify an earlier order. The transactions include a quote to sell a security, a quote to buy a security, and a quote to update an earlier quote. The order book is stored in a random access memory. Providing an order book includes providing an order book maintained in a random access memory. The security is listed on a public stock market. The method includes receiving an order to buy or sell a security or to modify a previous order, verifying the validity of the order, and storing the order as an event in the queue. The method includes receiving a quote to buy or sell a security or to modify a previous quote, verifying the validity of the quote, and storing the quote as an event in the queue. The method includes an event that indicates opening of a market for the transaction of the security, and an event that indicates closing of the market. The events include supervisory commands that affect orders or quotes related to one or more securities. The supervisory commands include a command to halt transactions related to one or more securities.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
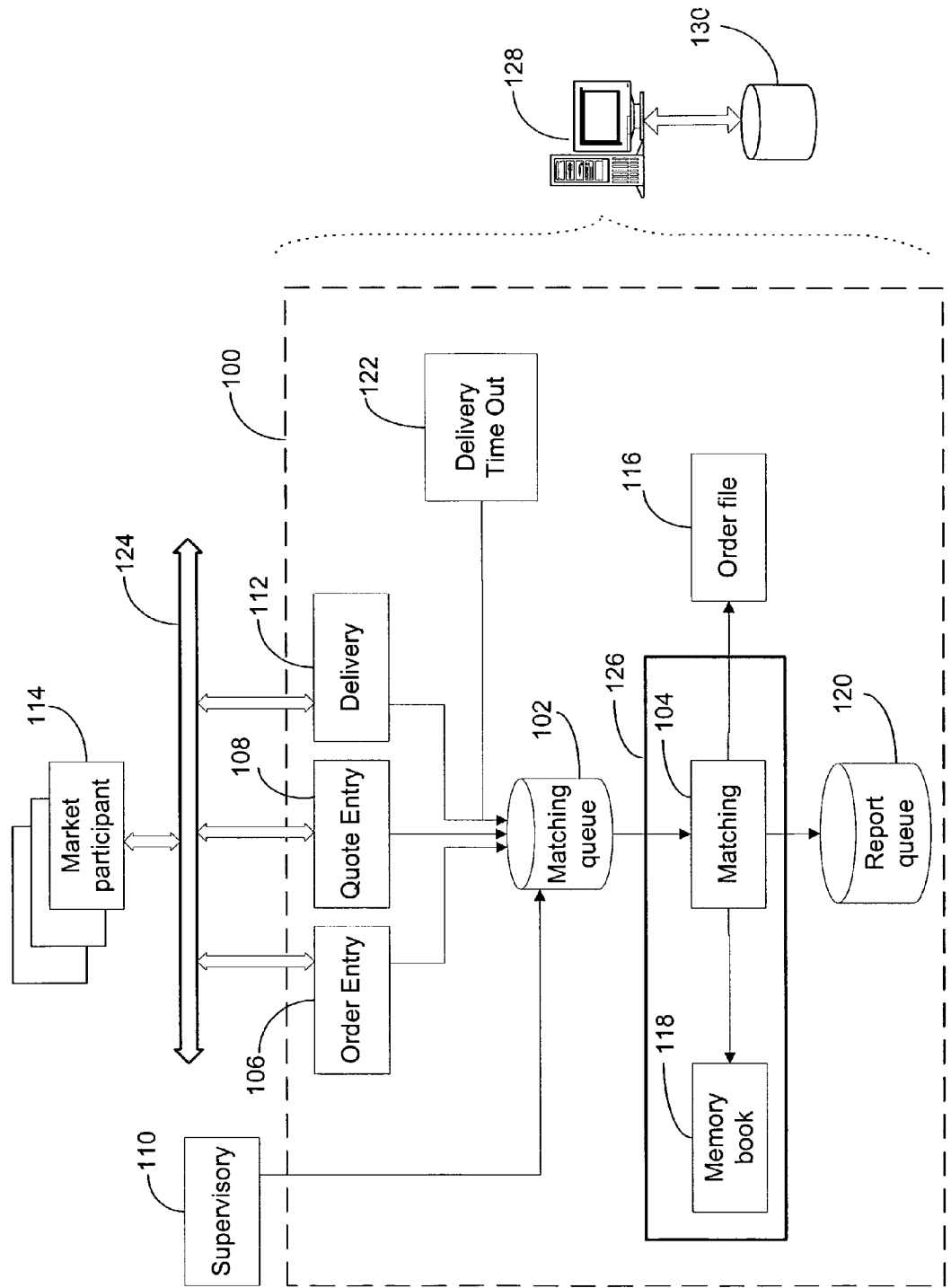
FIG. 1 is a block diagram of a system for executing securities transactions.

Referring to FIG. 1, a securities processor 100 includes a matching queue 102 that receives events from different modules and forwards the events to a matching process 104 that matches orders (or quotes) to buy a security with orders (or quotes) to sell the security. The events received by matching queue 102 include, for example, orders, quotes, supervisory commands, delivery notifications, and delivery timeout signals. Matching queue 102 is maintained in a non-volatile memory (such as a magnetic disk drive) and implemented as a first-in-first-out (FIFO) queue. By using the matching queue 102 to store events that "trigger" the matching process 104 to perform actions, the events can be processed faster while ensuring that no events are lost due to power loss, processing error, or communication failure.

Matching queue 102 receives orders from an order entry module 106, which in turn receives the orders from market participants 114. Order entry module 106 examines the orders, and passes valid orders to matching queue 102. Matching queue 102 receives quotes from a quote entry module 108, which receives the quotes from market participants 114 as well. Quote entry module 108 examines the quotes, and passes valid quotes to the matching queue 102. Market participants 114 are registered users of the security processor 100, and include, for example, market makers, electronic commerce networks (ECN), and order entry firms (e.g., broker/dealers). Individual investors buy and sell securities through the market participants.

A market participant may submit multiple orders to buy (or sell) a particular security at the same or different prices. The orders may be canceled or replaced with a new order. Each order carries a time stamp, and the orders are processed in sequence. A market participant may also decide not to submit any orders during a trading day. For market makers, although they do not have to submit orders, in some embodiments they must provide a quote purchase price and a quote sell price for each security that they make a market in. By submitting the quotes prices, a market maker warrants that it is willing to purchase the security at the purchase quote price, and is willing to sell the security at the quote sell price. The quote prices may be updated throughout the trading day.

Securities processor 100 and supervisory module 110 reside on a server 128 that is connected to a network 124 (e.g., the Internet, an intranet, or a local area network). Server 128 includes at least one central processing unit (not shown) and main memory system (not shown). Typically, server 128 is a multi-processing, fault-tolerant system that includes multiple central processing units that each have a dedicated main memory system or share a common main memory pool. Software for implementing securities processor 100 and the supervisory module 110 are stored in a storage device 130 connected to server 128. Additionally, securities processor 100 stores all information relating to securities transactions on storage device 130. Storage device 130 can be, for example, a hard disk drive, a tape drive, an optical drive, a RAID array, a random access memory (RAM), or a read-only memory (ROM).

While being executed by the central processing unit(s) of server 16, the software for implementing securities processor 100 and the supervisory module 110 is loaded from storage device 130 and run in main memory of server 128. As will be described in more detail below, during runtime, some modules of securities processor 100 will reside in main memory (which is typically random access memory), and some modules of securities processor 100 will reside in storage device 130 (which is typically non-volatile storage). This allows securities processor 100 to process data faster by storing data in random access memory and to have fault-tolerant capability by duplicating data in non-volatile storage.

Matching queue 102 receives supervisory commands from a supervisory module 110 that oversees the operation of the securities processor 100. Supervisory commands may indicate, for example, market opening or market closing. Supervisory commands may indicate that the equipment of a certain market participant is down ("Office Outage" command), or that the equipment is back up running again ("Release Office Outage" command). Supervisory commands may be issued to block a market participant's positions from being opened during the market opening process ("Prevent Open" command), or to cancel a previously entered Prevent Open transaction ("Remove Prevent Open" command). Supervisory commands may be issued to update a position record for a market participant ("Update Position Information" command), or to purge one or more market participants' orders ("Mass Purge" command). Supervisory commands may indicate halt trading of a particular security, or halt trading of all securities.

Matching queue 102 receives delivery notifications from a delivery notification module 112. Delivery notifications may indicate that a certain market participant accepted, partially accepted, or declined execution of a transaction. For example, an ECN may have issued an order to purchase 1000 shares of stock A at $10. The matching process 104 matches that order with another order to sell 2000 shares of stock A at $10. The matching process 104 delivers a message to the ECN asking whether the ECN wishes to accept the execution, to partially accept the execution, or to cancel the order. The ECN may accept the execution and purchase 1000 shares of stock A at $10. The ECN may partially accept the execution and purchase only 500 shares of stock A at price $10. The ECN may also decide that the 1000 shares of stock A at $10 has already been purchased from another stock exchange, and thus decline execution of the whole transaction conducted by matching process 104. If the ECN does not response within a preset time period, such as 30 seconds, a delivery time out module 122 sends a delivery time out event to matching queue 102 indicating that no response has been received from the ECN.

Market participants 114 may issue orders or quotes faster than matching process 104 is capable of handling, such as when unexpected heavy trading of certain securities occur. By using the matching queue 102 as intermediary between matching process 104 and modules 106, 108, 110, and 112, there is no need for a hand-shaking procedure to ensure safe delivery of the events. There is no need for the matching process to send an acknowledgement to the module sending the event to indicate correct receipt of the event. By using the matching queue 102, a module sending an event only has to correctly write the event into the matching queue 102, and does not need to know when the event will be processed by the matching process 104. As long as the event is safely stored in the matching queue 102, the event will eventually be processed by the matching process 104. By not requiring matching process 104 to send acknowledgement signals, matching process 104 can process events faster. Modules 106, 108, 110, 112, and 114 can also operate more efficiently without having to wait for the acknowledgement from the matching process 104.

Because the message queue is implemented in non-volatile memory, the events are not lost when the security processor 100 loses power. When power is restored, matching process 104 can compare the message queue 102 with an order file 116 that serves as a log file to record the events that have been received by the matching process 104. The matching process 104 then processes the events that have not been processed in the sequence stored in the matching queue 102.

When the matching process 104 receives a new order (or quote) to buy or sell a security, matching process 104 compares that order (or quote) with the orders (or quotes) already stored in an in memory order book 118 that is resident in main memory 126. In memory order book 118 is maintained in main memory 126 or alternatively, a level of cache memory or equivalent that is typically implemented as random access memory. If the new order (or quote) can be matched with a "contra-side" order (or quote) stored in the in memory order book 118, the matching process 104 executes the transaction. The contra-side order of a buy order is a sell order or a sell (or sometimes referred to as an ask) quote, and the contra-side order of sell order is a buy order or a buy (or sometimes referred to as a bid) quote. The matching process removes the already matched order from the in memory order book 118, and writes a record of the transaction to a report queue 120. The report queue 120 is used to broadcast the transaction to other modules (not shown in the figure) in the securities processor 100. If the new order (or quote) cannot be matched with another order (or quote) in the in memory order book 118, the new order is stored in the in memory order book 118 to await matching with later orders (or quotes).

When the matching process 104 receives an event indicating an update of a quote purchase or sell price of a security for a market maker, matching process 104 updates the quote purchase or sell price and compares the updated quote with quotes from other market makers and orders already stored in the in memory order book 118. If the updated quote can be matched with other quotes or orders, the matching process 104 executes the transaction (and removes the already matched order from the in memory order book 118 if appropriate), and writes a record of the transaction to the report queue 120.

When the matching process 104 writes to the in memory order book 118, matching process 104 simultaneously writes to an order file 116 stored in a non-volatile storage device (such as a magnetic disk drive). Other modules (not shown in the figure) can determine the content of in memory order book 118 by accessing order file 116, but only the matching process 104 can access the in memory order book 118. This ensures that matching process 104 can process events reliably at a high speed while keeping downstream modules up-to-date on the latest transaction details. Because order file 106 is stored in a non-volatile storage device, data is not lost when the power is lost, so the matching process 104 can reconstruct the in memory order book 118 from the order file 116 after a power failure.

The following describes the important events that may be sent to the matching queue 102.

"New Order" event: This event is sent by the order entry module 106 to place a new order on a security.

"Cancel/Replace" event: This event is sent by the order entry module 106 to cancel an old order and place a new order on the in memory order book 118 with a new time stamp. The orders are processed by the securities processor 100.

"Quote Update" event: This event is sent by the quote entry module 106 to update a quote position of a market participant.

"Order Reinstate" event: This event is sent by the quote entry module 106 to reinstate an order that was canceled.

"Delivery Message" event: This event contains a delivery message, and is sent by the delivery notification module 112.

"Security Halt" event: This event is sent by the supervisory module 110 in unusual cases (e.g., when there is material news that may affect the stock price) to suspend trading in a security and place the security in a "trade halt" status. When the matching process 104 reads this event, process 104 cancels all quotes related to that security and put orders related to that security in "not available" status. When the security is in the "trade halt" status, quote updates are not allowed, and orders with "not available" status can not be matched with other orders.

"Security Halt Release" event: This event is sent by the supervisory module 110 to allow quotes of the security to be entered. When the matching process 104 receives this event, process 104 changes orders in the "not available" status to "open" status to resume trading of the security.

"Pre Open" event: This event is sent by the supervisory module 110 prior to market open (e.g., around 9:29:30 AM) to signal the matching process 104 to review all orders in each security and execute orders that are locking or crossing.

"Market Open" event: This event is sent by the supervisory module 110 prior to market open (e.g., around 9:30:00 AM) to signal the matching process 104 to mark each security as having an "open" status to allow trading of the security.

"Market Close" event: This event is sent by the supervisory module 110 at a predetermined time (e.g., around 4:00 PM) to signal the matching process 104 to close the quote positions that have close time at the predetermined time. For the quote positions that remain open after the predetermined time, the matching process 104 calculates the quote positions to be displayed to the public.

"Emergency Market Condition Halt" event: This event is sent by the supervisory module 110 in unusual circumstances (e.g., when certain market index drops steeply and reach a lower threshold) to signal the matching process 104 to stop execution of all orders.

"Emergency Market Condition Release" event: This event is sent by the supervisory module 110 to signal the matching process 104 to resume execution of each order.

"Apply Dividends" event: This event is sent by the supervisory module 110 to signal the matching process 104 to adjust the prices, sizes, and reserve sizes of relevant orders depending on the type of dividend. For example, if the dividend is a stock split 2 for 1, all prices in relevant buy orders are reduced by half and the sizes are doubled. For a cash dividend, the cash amount of the dividend is subtracted from the buy order price. Sell orders are not adjusted.

"Rollback of Dividends" event: This event is sent by the supervisory module 110 to signal the matching process 104 to roll back the dividend changes previously applied. This may occur when the supervisory module 110 previously entered dividends by mistake.

"Office Outage" event: This event is sent by the supervisory module 110 to signal that a market participant has equipment problems and is unable to conduct business. When the matching process 104 receives this event, process 104 adjusts the quotes and orders of this market participant to an "outage" status. These orders are temporarily unavailable and not displayed to the public.

"Office Release" event: This event is sent by the supervisory module 110 to signal that a market participant is ready to participate in the market again. When the matching process 104 receives this event, process 104 checks whether by changing the "outage" status will cause the market participant's old orders and quotes to lock or cross the market. If the market will be locked or crossed, the "outage" status is not changed. The market participant is required to enter new quotes or orders that do not create locked or crossed market conditions. The matching process 104 then adjusts the quotes and orders from the "outage" status to "open" status so that the quotes and orders are reachable (i.e., can be matched with contra side quotes or orders).

"Mass Order Purge" event: This event is sent by the supervisory module 110 to purge all the orders and/or quotes for a specified security or market participant. When matching process 104 receives this event, it reviews the in memory order book 118 and purges all orders and/or quotes that corresponds to the specified security or market participant.

"Registration" event: The event is sent by the supervisory module 110. Before a market participant can enter quotes and conduct transactions in a security, the market participant needs to register for that security. When the matching process 104 receives the "registration" event, process 104 creates a position for the market participant in a specified security. After registration, quotes and orders from the market participant relating to the registered security will be accepted.

Figure 2:
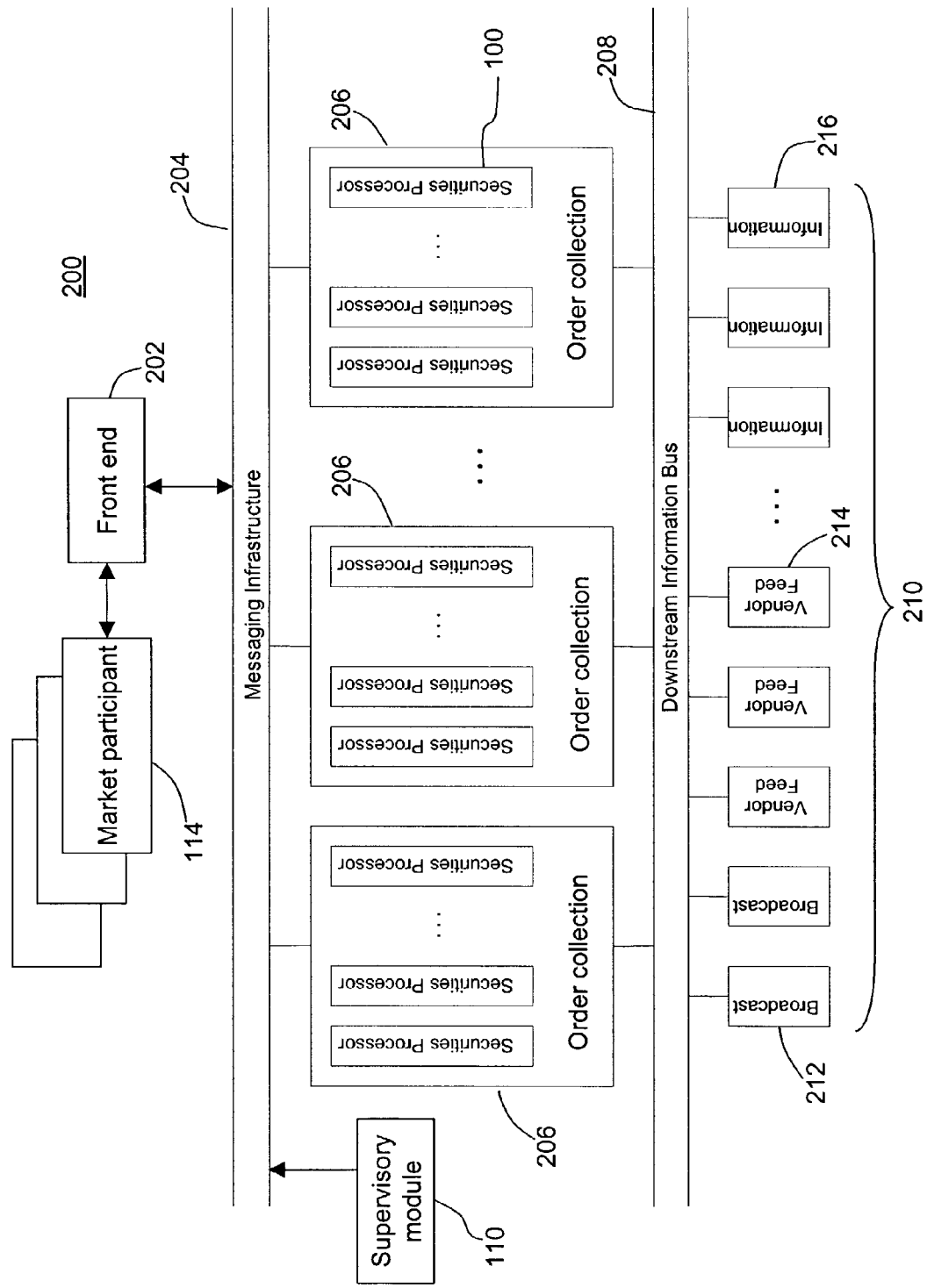
FIG. 2 is a block diagram of a securities processing network.

FIG. 2 shows a securities processing network 200 using securities processors 100. Securities processing network 200 includes a front end module 202 for receiving orders (or quotes) from market participants 114, order collection modules 206 that process the orders (or quotes), the supervisory module 110, and downstream modules 210 for processing information related to transactions that have been executed. The front end module 202 produces a graphical user interface to allow market participants 114 to easily access the services of the securities processing network 200.

A messaging infrastructure 204 allows messages to be communicated among the front end module 102 and the order collection modules 206. A downstream information bus 208 provides a "message publish/subscribe" mechanism in which the order collection modules 206 publish messages onto bus 208, and the downstream modules 210 subscribe to messages on the bus 208.

Securities processing network 200 allows scalability so that more order collection modules 206 may be added to network 200 as the transaction volume increases. Each order collection module 206 is assigned to process orders (or quotes) related to predetermined types of securities. Each order collection module 206 can serve one or more securities processors, each securities processor handling a subset of securities for which the order collection module 206 is responsible. The mapping of securities to the order collection modules (or securities processors) is stored in a table that can be updated. The update process may occur after market close. Each day, the transaction volumes of the order collection modules 26 are analyzed, and the mapping table is updated to balance the transaction volume of each order collection module 206 and securities processor 100.

Different methods may be used to distribute the work-load among various order collection modules 206 and securities processors 100. For example, one order collection module 206 may process securities with symbols starting from A-C, while another order collection module 206 may process securities with symbols starting from D-F, etc. A securities processor may be dedicated to process a single security with a large transaction volume.

Downstream modules 210 include, for example, broadcast modules 212, vendor feed modules 214, and information modules 216. Broadcast modules 212 receive information from the securities processors 100 through the downstream information bus 208 and broadcast the information to subscribers of the information. Vendor feed modules 214 allow vendors (e.g., market participants) to send queries (e.g., inquire about the last ten transactions for a certain security) to the securities processors and receive information in responses to those queries. Information modules 216 receive information from the bus 208, process the information according to predefined formats, and send the formatted information to subscribers (e.g., news wire agencies).

The "publish/subscribe" architecture of the downstream information bus 208 allows for horizontally scalable processing in the downstream applications. The publish/subscribe architecture inserts a layer of independence between data producers (publishers) and data consumers (subscribers). If a new application needs, for example, last trade information, such information can be inserted into the bus 208, and the subscriber (the new application) can subscribe to the last trade information with no effect on the publisher (or publishers) of the last trade information. This architecture isolates data consumers from data producers.

Order collection modules 206 (including securities processors 100) and supervisory module 100 described above may find applicability in any computing or processing environment and with any type of machine that is capable of running a computer program. The order collection modules and the supervisory module may be implemented in hardware, software, or a combination of hardware and software. For example, the order collection modules and the supervisory module may be implemented in a circuit that includes one or a combination of a processor, a memory, programmable logic and logic gates. The order collection modules and the supervisory module may also be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using the input device to generate output information.

The programs may be implemented in a high level procedural or object-oriented programming language to communicate with the computers/machines. The programs may also be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes. The order collection modules and the supervisory module may also be implemented as a machine-readable storage medium, configured with a computer program, where upon execution, instructions in the computer program cause the computer to operate and perform the functions of the order collection modules and the supervisory module.

Although some implementations have been described above, other embodiments are also within the scope of the following claims. For example, the matching queue 102 may receive events or commands other than the ones described. The matching queue 102 may receive events from modules other than the ones described.

What is claimed is:

1. A computer system apparatus, the apparatus comprising:
non-volatile storage;
a random access memory;
a first-in-first-out event queue maintained in the non-volatile storage, the event queue configured to store a set of events, the set of events comprising incoming orders for a security;
an order book maintained in the random access memory, the order book configured to store one or more outstanding orders for the security;
an order file maintained in the non-volatile storage, the order file configured to store the orders stored in the order book; and
a processor configured to perform operations that include:
 receiving an event that includes an order for the security;
 responsive to the receiving the event, storing the event in the event queue in the non-volatile storage;
 after storing the event in the event queue:
  attempting to match the order against the outstanding orders stored in the order book in the random access memory;
  determining that the order cannot be matched against any of the outstanding orders stored in the order book; and
  responsive to the determining that the order cannot be matched, simultaneously writing the order to the order book in the random access memory and writing the order to the order file in the non-volatile storage, wherein:

the attempting to match the order against the outstanding orders is performed within a matching process that is executed by the processor;

only the matching process is permitted to access the order book in the random access memory; and one or more modules executed by the processor are permitted to access the order file in the non-volatile storage.

2. The apparatus of claim 1 wherein the set of events further includes a quote to sell the security, a quote to buy the security, and an instruction to modify a previous quote for the security.

3. The apparatus of claim 1 wherein the set of events further includes a supervisory command that affects orders or quotes related to the security.

4. The apparatus of claim 3 wherein the supervisory command is a command to halt trading in the security.

5. The apparatus of claim 1, wherein the operations further include:

after power to the apparatus is lost and restored, reconstructing the order book in the random access memory based on the order file in the non-volatile storage.

6. The apparatus of claim 5, wherein the reconstructing the order book includes comparing the event queue in the non-volatile storage to the order file in the non-volatile storage.

7. A computer system comprising:

a processor;

non-volatile storage coupled to the processor; and a random access memory coupled to the processor;

wherein the non-volatile memory is configured to store a first-in-first-out event queue, the event queue configured to store events, the events comprising orders for a security;

wherein the random access memory is configured to store an order book, the order book including outstanding orders for the security;

wherein the non-volatile memory is configured to store an order file; and wherein the random access memory is configured to store instructions that, when executed by the processor, cause the processor to perform operations that include:

storing an event in the event queue, the event including an order for the security;

determining whether the order can be matched with a contra-side order stored in the order book; and responsive to determining that the order cannot be matched:

writing the order to the order book; and when writing the order to the order book, writing the order to the order file, wherein:

the determining whether the order can be matched with a contra-side order stored in the order book is performed within a matching process that is executed by the processor;

only the matching process is permitted to access the order book in the random access memory; and one or more modules executed by the processor are permitted to access the order file in the non-volatile storage.

8. The computer system of claim 7 wherein the events further include a quote to buy the security, a quote to sell the security, or an instruction to modify a previous quote for the security.

9. The computer system of claim 7 wherein the events further include a supervisory command that affects orders or quotes related to the security.

10. The computer system of claim 9 wherein the supervisory command is a command to halt transactions in the security.

11. The computer system of claim 7, wherein the operations further include:

after power to the computer system is lost and restored, reconstructing the order book based on the order file.

12. The computer system of claim 11, wherein the reconstructing the order book includes comparing the event queue to the order file.

* * * * *